United States Patent [19]

Ohtawa

[11] Patent Number: 5,130,979
[45] Date of Patent: Jul. 14, 1992

[54] FRAME CONVERTER USING A DUAL-PORT RANDOM ACCESS MEMORY
[75] Inventor: Masayuki Ohtawa, Tokyo, Japan
[73] Assignee: NEC Corporation, Tokyo, Japan
[21] Appl. No.: 376,368
[22] Filed: Jul. 6, 1989
[30] Foreign Application Priority Data
  Jul. 8, 1988 [JP]  Japan .................. 63-170073
[51] Int. Cl.⁵ ........................................ H04Q 11/08
[52] U.S. Cl. ........................................ 370/67; 370/68
[58] Field of Search .......................... 370/66, 67, 68
[56] References Cited
U.S. PATENT DOCUMENTS

| H,586 | 2/1989 | Kun | 370/94.1 |
|---|---|---|---|
| 4,450,557 | 5/1984 | Munter | 370/67 |
| 4,782,479 | 11/1988 | Rozema | 370/66 |
| 4,941,141 | 7/1990 | Hayano | 370/68 |

Primary Examiner—Douglas W. Olms
Assistant Examiner—Melvin Marcelo
Attorney, Agent, or Firm—Laff, Whitesel, Conte & Saret

[57] ABSTRACT

For rearranging the time slots of an incoming frame according to a specified order and generating an outgoing frame. A time base generates timing pulses at intervals N times greater than the intervals at which the incoming and outgoing frames are generated, where N is an integer equal to or greater than 2. There is provided a dual-port random access memory capable of writing the time slots of a given incoming frame into memory cells and simultaneously reading the time slots of a rearranged version of a frame preceding the given incoming frame. A write address code is supplied to the random access memory in response to each of the timing pulses to write N successive incoming frames and a read address code is generated in accordance with a switching control signal and supplied to the random access memory in response to each of the timing pulses to read N successive outgoing frames.

4 Claims, 2 Drawing Sheets

FRAME CONVERTER USING A DUAL-PORT RANDOM ACCESS MEMORY

BACKGROUND OF THE INVENTION

The present invention relates to a frame converter for interchanging time slots of a framed sequence.

A known frame converter comprises two single-port random access memories for rearranging the time slots of an incoming frame according to a specified order of an outgoing frame. The known frame converter additionally includes two buffer circuits for respectively storing successive incoming frames, two switching circuits for causing one of the random access memories to successively operate in write and read modes and causing the other memory to successively operate in read and write modes, and a selecting gate circuit that passes one of the outputs of the buffer circuits to an output terminal.

However, it has been desired to simplify the circuitry of the conventional frame converter.

SUMMARY OF THE INVENTION

It is therefore an object of the present invention to provide simplified frame converter circuitry by the use of a dual-port random access memory.

The frame converter of the present invention rearranges the time slots of an incoming frame according to a specified order and generates an outgoing frame containing the rearranged time slots. The frame converter comprises a time base for generating timing pulses at intervals N times greater than the intervals at which the incoming and outgoing frames are generated, where N is an integer equal to or greater than 2. The dual-port random access memory is capable of writing the time slots of a given incoming frame into memory cells and simultaneously reading the time slots of a rearranged version of a frame preceding the given incoming frame. A write address generator supplies a write address code to the random access memory in response to each of the timing pulses to cause the memory to write N successive incoming frames therein. A read address generator supplies a read address code to the random access memory in response to each of the timing pulses to cause the memory to read N successive outgoing frames therefrom. An address controller is provided for controlling one of the write and read address generators so that the time slots of each of the outgoing frames read out of the memory are rearranged according to the specified order.

BRIEF DESCRIPTION OF THE DRAWINGS

The present invention will be described in further detail with reference to the accompanying drawings, in which.

DETAILED DESCRIPTION

Figure 1:
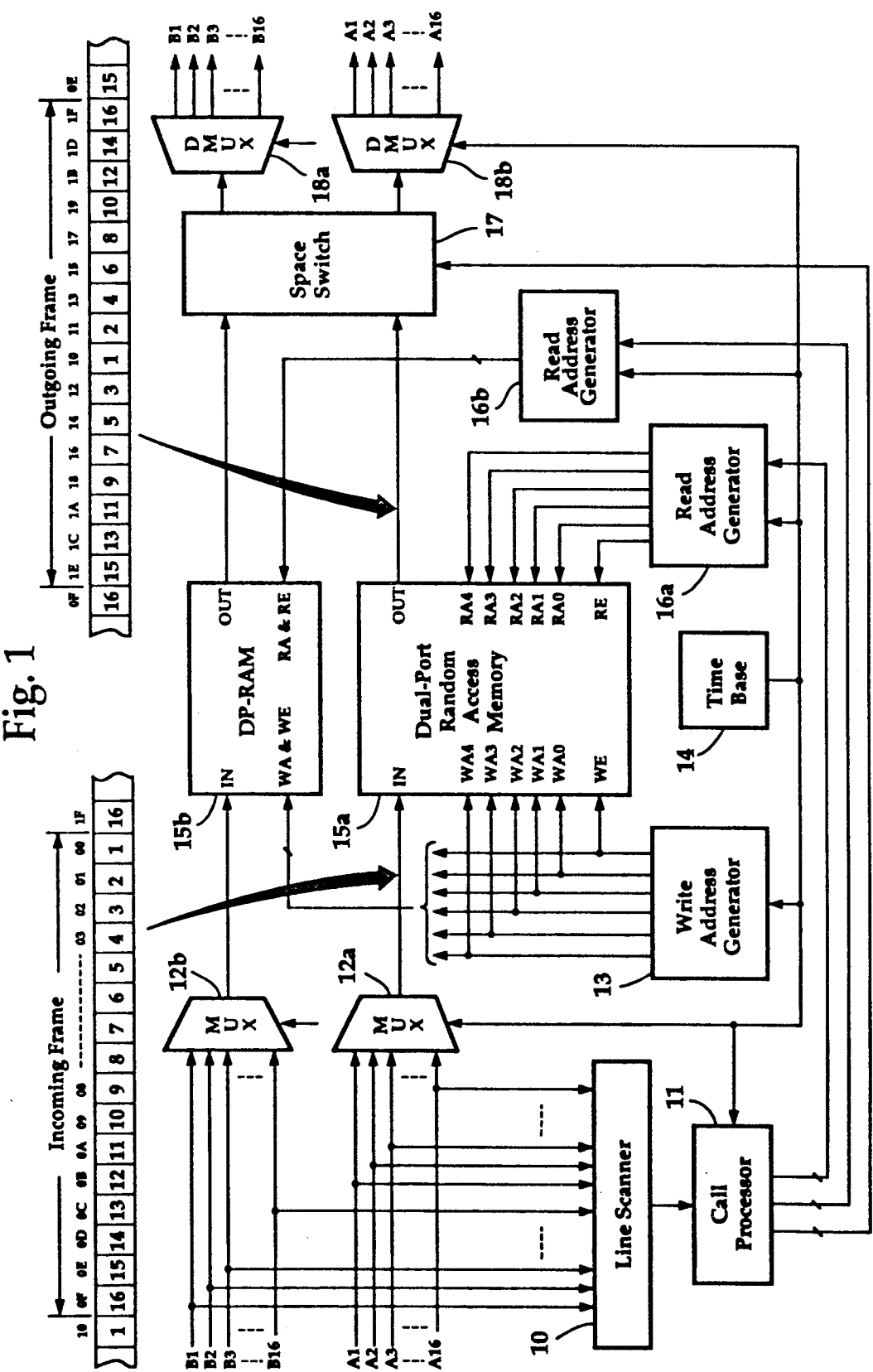
FIG. 1 is a block diagram of a digital switching system incorporating a dual-pot random access memory as a time slot interchanger.

In FIG. 1, a frame converter of the present invention is shown as comprising dual-port random access memories 15a and 15b operating as time switches of a digital switching system. Each of the dual-port memories 15a, 15b is capable of simultaneously writing a given incoming frame and reading a slot-interchanged version of an incoming frame that precedes the given incoming frame.

The switching system includes a line scanner 10 that scans subscriber lines A1 through A16 and B1 through B16 to sequentially allow the subscribers to have access to a call processor 11. Signals from subscriber lines A1 to A16 are multiplexed by a time division multiplexer 12a into a sequence of time division multiplexed (TDM) signal and those from lines B1 to B16 are multiplexed by a time division multiplexer 12b into a sequence of similar TDM signal. Specifically, the signal from each subscriber line of each multiplexer group is divided into samples at frame intervals. Each multiplexer divides a frame period into 16 time slots, sequentially assigns them to the subscriber lines connected to it and inserts each sample of a given subscriber line to the assigned time slot.

The TDM outputs from multiplexer 12a and 12b are respectively coupled to the data input ports of the dual-port random access memories 15a and 15b. A write address generator 13 is provided which receives a timing pulse from time base 14 and sequentially supplies a 5-bit write address code to write input ports WA0 to WA4 of the random access memories 15a and 15b and write enable pulses to the write-enable port WE of the memories, so that signals on time slots of each TDM frame are sequentially stored into the associated dual-port RAM 15.

Call processor 11 determines a called subscriber line from the signal from the line scanner 10 and supplies a time switching signal to a selected one of read address generators 16a and 16b which are respectively associated with the random access memories 15a and 15b to allow the selected read address generator to supply a 5-bit read address code to the read address ports RA0 to RA4 of the associated memory and read enable pulses to the read enable port RE of the memory.

The data output port of each RAM 15 is connected to a space switch 17. Call processor 11 supplies a space switching signal to the space switch 17 to cause it to selectively couple the time-switched TDM inputs from memories 15a and 15b to the inputs of time division demultiplexers 18a and 18b whose outputs are respectively coupled to the subscriber lines A1 to A16 and B1 to B16.

Figure 2:
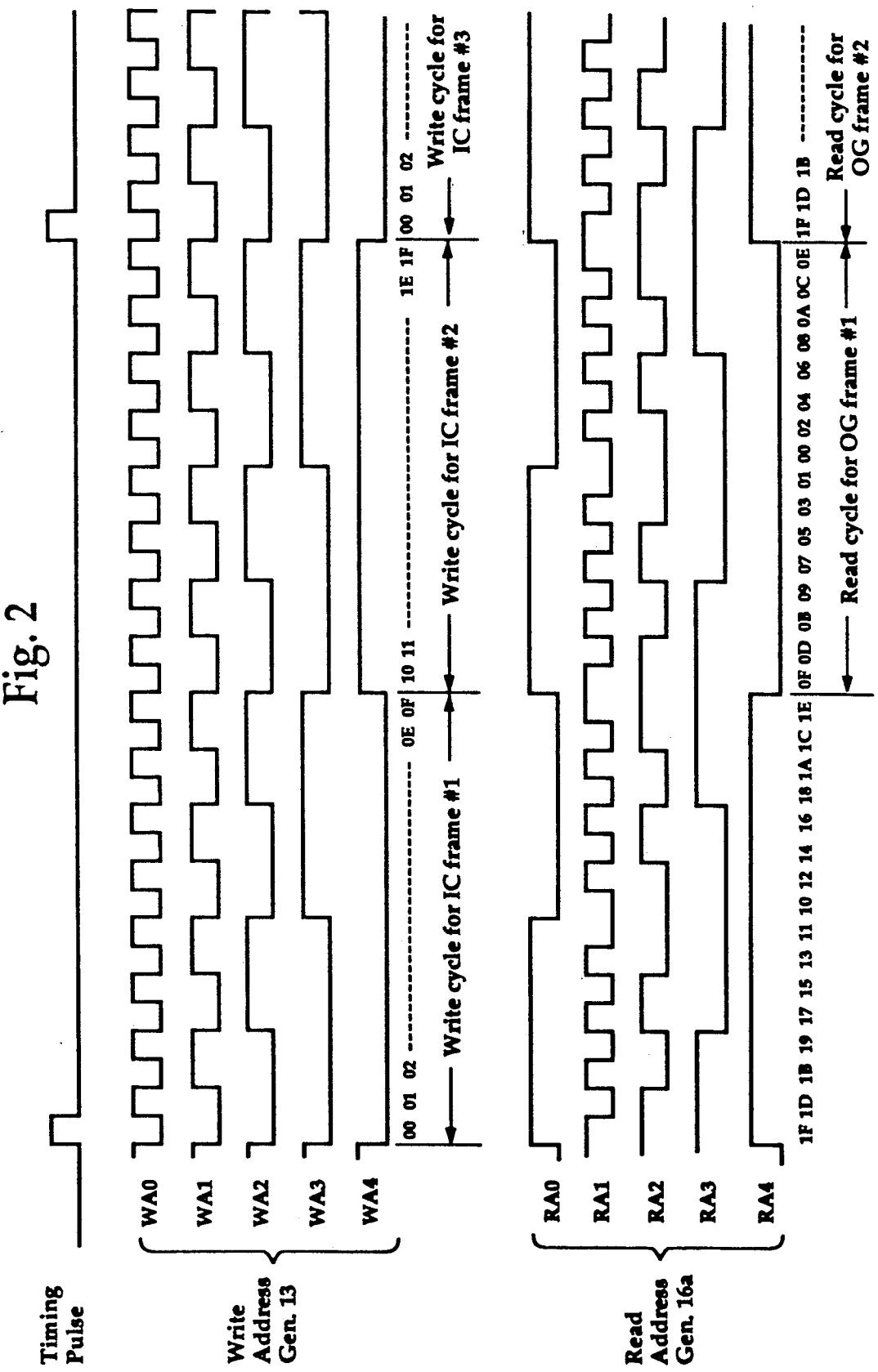
FIG. 2 is a timing diagram showing the internal states of the read and write address generators.

The operation of the dual-port random access memories 15a and 15b in conjunction with the operation of the switching system will be given below with reference to a timing diagram of FIG. 2.

The timing pulse generated by time base 14 appears at constant periodic intervals which are twice the frame intervals. To define the time slots of an incoming frame #1 during the first half period of the interval between successive timing pulses, the least significant bit WA0 of the 5-bit write address code generated by write address generator 13 is at logic 1 for odd-numbered time slots 01 through 0F in the hexadecimal notation and at logic 0 for even-numbered time slots 00 to 0E. Likewise, the time slots of an incoming frame #2 are defined during the second half period of the interval of the timing pulses by the least significant bit WA0 is at logic 1 for odd-numbered time slots 11 through 1F in the hexadecimal notation and at logic 0 for even-numbered time slots 10 to 1E. The process is repeated so that the next interval of the timing pulses begins with a time slot 00 for writing an incoming frame #3. The pulse length of the address bits WA1 to WA3 is twice the pulse length of their next lower significant bits as indicated so that the most significant write address bit WA4 is at logic 0 during the incoming frame #1 and at logic 1 during the incoming frame #2. The write address bits WA0 to WA4 sequentially identify the locations of memory cells in each of the RAMs 15a and 15b that respectively correspond to time slots 00 to 0F and 10 to 1F.

On the other hand, each of the read address generators 16a and 16b is under the control of the call processor 11. If the time slots of a given incoming frame supplied to the RAM 15a are switched to the time slots of an outgoing frame as indicated in FIG. 1, the processor 11 controls the read address generator 16a to generate waveforms as indicated by RA0 to RA4 in FIG. 2 so that when the read enable pulse is at logic 0 during the first half period of the interval between successive timing pulses and at logic 1 during the next half period. With the read enable pulse being at logic 0, the read address bits RA0 to RA4 are controlled to identify the memory cells in the RAM 15a that correspond respectively to time slots 1F, 1D, 1B, 19, 17, 15, 13, 11, 10, 12, 14, 16, 18, 1A, 1C and 1E to read out the data of an incoming frame preceding the incoming frame #1. With the read enable pulse being switched to logic 1, the read address bits RA0 to RA4 identify the memory cells in the RAM 15a that correspond to time slots 0F, 0D, 0B, 09, 07, 05, 03, 01, 00, 02, 04, 06, 08, 0A, 0C and 0E to read out the data of the incoming frame #1 to produce an outgoing frame #1. In like manner, the data stored during the second half period of the time base interval is read out during the first half period of the next time base interval to produce an outgoing frame #2.

By appropriately controlling the space switch 17 in a manner well known in the art, a call in any given time slot of any incoming frame can be switched to the time slot of any of the subscriber lines A1–A16 and B1–B16.

While mention has been made of an embodiment in which incoming frame are sequentially written into the associated random access memories and they are read out in non-sequential manner according to the switching signals, modifications are apparent to those skilled in the art by non-sequentially writing the incoming frames into the memories according to the switching signals and reading them sequentially from the memories. In addition, the outgoing frame can be read out at a different speed from the writing speed.

What is claimed is:

1. A frame converter for rearranging time slots of an incoming frame according to a specified order to generate an outgoing frame, comprising:
    time base means for generating timing pulses at intervals which are N times greater than the intervals at which said incoming and outgoing frames are generated, where N is an integer equal to or greater than 2;
    a dual-port random access memory capable of storing signals in the time slots of an incoming frame into memory cells and reading signals of the time slots of said incoming frame before or after said frame is completely stored into the memory;
    write address generator means for supplying a write address code to said random access memory in response to each of said timing pulses to cause said memory to store signals in N successive incoming frames therein;
    read address generator means for supplying a read address code to said random access memory; and
    address control means for controlling one of said write and read address generator means so that the time slots of each of said outgoing frames read out of said memory are a rearranged version of the time slots of each of said incoming frames according to said specified order and controlling said read address generator means to start generating said read address code before or after an incoming frame is completely stored into said memory.

2. A frame converter as claimed in claim 1, further comprising multiplexer means for multiplexing a plurality of incoming signals into the time slots of each of said incoming frames and for applying said incoming frames to said memory, and demultiplexer means for demultiplexing the time slots of each of said outgoing frames into a plurality of outgoing signals.

3. A time division switching system for interchanging time slots of incoming TDM (time division multiplex) signals to produce outgoing TDM signals, the time slots of each of said incoming and outgoing TDM signals being organized into frames, said switching system comprising:
    time base means for generating timing pulses at intervals which are N times greater than the intervals at which the frame of said incoming and outgoing TDM signals are generated, where N is an integer equal to or greater than 2;
    a first dual-pot random access memory capable of storing signals in the time slots of a frame of a first incoming TDM signal and simultaneously reading signals from the time slots of said incoming frame before or after said frame is completely stored into the first dual-port random memory;
    a second dual-port random access memory capable of storing signals in the time slots of a frame of a second incoming TDM signal and simultaneously reading signals from the time slots of said incoming frame before or after said frame is completely stored into the second dual-port random memory;
    write address generator means for supplying a write address code to said first and second dual-port random access memories in response to each of said timing pulses to cause said memories to store signals in N successive frames of said first and second incoming TDM signals;
    first read address generator means for supplying a read address code to said first dual-port random access memory;
    second read address generator means for supplying a read address code to said second random access memory;
    address control means for controlling said first and second read address generator means so that the time slots of each frame of said first and second outgoing TDM signals read out of said memories are a rearranged version of the time slots of each frame of said first and second incoming TDM signals according to a specified order and causing said first and second read address generator means to start generating said read address code of each of said memories before or after an incoming frame is completely stored in the memory; and
    space switch means for setting up connections from outputs of said first and second dual-pot random access memories to a plurality of output terminals.

4. A time division switching system as claimed in claim 3, further comprising:

first multiplexer means for multiplexing a plurality of first incoming signals into the time slots of said first incoming TDM signal and for applying said first incoming TDM signal to said first dual-port random access memory;

second multiplexer means for multiplexing a plurality of second incoming signals into the time slots of said second incoming TDM signal and for applying said second incoming TDM signal to said second dual-port random access memory;

first demultiplexer means coupled to a first output of said space switch means for demultiplexing the time slots of either of said switched first and second outgoing TDM signals into a plurality of first outgoing signals; and second demultiplexer means coupled to a second output of said space switch means for demultiplexing the time slots of either of said switched first and second outgoing TDM signals into a plurality of second outgoing signals.

* * * * *